United States Patent
Rodgers et al.

(10) Patent No.: US 9,062,189 B2
(45) Date of Patent: Jun. 23, 2015

(54) ELASTOMERIC COMPOSITIONS COMPRISING HYDROCARBON POLYMER ADDITIVES

(75) Inventors: Michael B. Rodgers, Seabrook, TX (US); Anthony J. Dias, Houston, TX (US); Rick Dowell Davis, Ijamsville, MD (US); Thomas R. Barbee, Kingwood, TX (US); Shawn W. Mowry, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 760 days.

(21) Appl. No.: 12/345,154

(22) Filed: Dec. 29, 2008

(65) Prior Publication Data

US 2009/0186965 A1 Jul. 23, 2009

(51) Int. Cl.
| | |
|---|---|
| *C08L 9/00* | (2006.01) |
| *C08L 21/00* | (2006.01) |
| *B60C 1/00* | (2006.01) |
| *C08K 5/01* | (2006.01) |
| *C08L 7/00* | (2006.01) |
| *C08L 9/06* | (2006.01) |
| *C08K 3/00* | (2006.01) |
| *C08L 23/22* | (2006.01) |
| *C08L 23/28* | (2006.01) |

(52) U.S. Cl.
CPC ............... *C08L 21/00* (2013.01); *B60C 1/0016* (2013.04); *C08K 3/0033* (2013.01); *C08K 5/01* (2013.01); *C08L 7/00* (2013.01); *C08L 9/00* (2013.01); *C08L 9/06* (2013.01); *C08L 23/22* (2013.01); *C08L 23/283* (2013.01)

(58) Field of Classification Search
USPC ........................................ 524/525, 571, 575.5
See application file for complete search history.

(56) References Cited

U.S. PATENT DOCUMENTS

| | | | | |
|---|---|---|---|---|
| 3,607,829 | A | * | 9/1971 | Harris .............................. 525/211 |
| 3,784,530 | A | | 1/1974 | Osborn et al. |
| 3,846,352 | A | | 11/1974 | Bullard et al. |
| 4,010,140 | A | * | 3/1977 | Bullard et al. .................. 526/237 |
| 4,038,346 | A | * | 7/1977 | Feeney .......................... 524/505 |
| 5,901,766 | A | | 5/1999 | Sandstrom et al. |
| 6,214,919 | B1 | | 4/2001 | Schlademan et al. |
| 6,232,418 | B1 | | 5/2001 | Macedo et al. |
| 6,242,523 | B1 | | 6/2001 | Blok et al. |
| 6,403,743 | B1 | | 6/2002 | Clark et al. |
| 6,455,652 | B2 | | 9/2002 | Macedo et al. |
| 6,479,598 | B1 | | 11/2002 | Lewtas et al. |
| 6,646,067 | B2 | | 11/2003 | Lewtas et al. |
| 6,825,302 | B1 | * | 11/2004 | Cottman et al. .............. 526/237 |
| 6,867,267 | B2 | | 3/2005 | Lewtas et al. |
| 2001/0031847 | A1 | | 10/2001 | Macedo et al. |
| 2003/0194271 | A1 | * | 10/2003 | Solon .............................. 404/15 |
| 2004/0092644 | A1 | | 5/2004 | Labauze |
| 2004/0122157 | A1 | | 6/2004 | Labauze |
| 2005/0027057 | A1 | | 2/2005 | Dias et al. |
| 2005/0148713 | A1 | | 7/2005 | Labauze et al. |
| 2007/0149689 | A1 | | 6/2007 | Wang et al. |
| 2009/0186965 | A1 | | 7/2009 | Rodgers et al. |

FOREIGN PATENT DOCUMENTS

| | | |
|---|---|---|
| EP | 1 514 901 | 3/2005 |
| JP | 05-287126 | 11/1993 |
| JP | 09-328577 | 12/1997 |
| JP | 10-204216 | 8/1998 |
| JP | 2000-256515 | 9/2000 |
| JP | 2001-348461 | 12/2001 |
| JP | 2003-253051 | 10/2003 |
| JP | 3636546 | 1/2005 |
| JP | 2005-213486 | 8/2005 |
| KR | 2007-004255 | 1/2007 |
| SU | 765304 | 9/1980 |
| WO | 98-57999 | 12/1998 |
| WO | WO 2004/009700 | 1/2004 |
| WO | 2009/091490 | 7/2009 |

OTHER PUBLICATIONS

U.S. Appl. No. 11/824,266, filed Jun. 29, 2007, Mun Fu Tse.

* cited by examiner

Primary Examiner — Wenwen Cai

(57) ABSTRACT

Provided are elastomeric compositions comprising at least one elastomer and a hydrocarbon polymer additive. Preferably the hydrocarbon polymer additive comprises from 60 to 90% piperylene, from 5 to 15% cyclic components, from 5 to 20% styrenic components, up to 5% isoprene, up to 5% indenic components, and up to 10% amylene. Also provided are elastomeric compositions comprising at least one elastomer and a hydrocarbon polymer additive, wherein the hydrocarbon polymer additive has a molecular weight of from 520 to 650 g/mole and a glass transition temperature (Tg) of from 48 to 53° C. The elastomeric compositions are particularly useful in making tires and other cured rubber articles.

17 Claims, No Drawings

ELASTOMERIC COMPOSITIONS COMPRISING HYDROCARBON POLYMER ADDITIVES

PRIORITY CLAIM

This application claims priority to and the benefit of U.S. Ser. No. 61/022,122, filed Jan. 18, 2008.

FIELD OF THE INVENTION

This invention relates to hydrocarbon polymer additives and their use in elastomeric compositions. More particularly, this invention relates to the use of hydrocarbon polymer additives in cured elastomeric compositions.

BACKGROUND OF THE INVENTION

Elastomeric compositions are used in a wide variety of applications, including tire components such as treads and sidewalls, hoses, belts, footwear components, and vibration isolation devices. The selection of ingredients for the commercial formulation of an elastomeric composition depends upon the balance of properties desired, the application, and the application's end use.

For example, in the tire industry the balance between processing properties of the green (uncured) composition in the tire plant and in-service performance of the cured rubber tire composite is of particular importance. The ability to improve the endurance of tires used in a wide variety of conditions, such as is required for agricultural tires, aircraft tires, earthmover tires, heavy-duty truck tires, mining tires, motorcycle tires, medium truck tires, and passenger car tires, while maintaining ease of processability of the uncured elastomeric composition is also of significant importance. Additionally, the goals of improving air impermeability properties, flex fatigue properties, and the adhesion of the elastomeric composition to adjoining tire components without affecting the processability of the uncured elastomeric composition or while maintaining or improving the physical property performance of the cured elastomeric composition still remain.

Conventionally, various processing oils, such as naphthenic, paraffinic, and aromatic oils, have been added to most tire components to aid compound processing. Aromatic oil has been preferred due to its processing effectiveness and beneficial secondary properties, e.g., adhesion. However, these processing oils, particularly aromatic oils containing distilled aromatic extracts, are being replaced due to health, safety, and environmental concerns. For example, European Union Directive 2005/69/EC is requiring the reduction of polycyclic aromatic hydrocarbons ("PAH") in passenger car tires, light and heavy truck tires, agricultural tires, and motorcycle tires by Jan. 1, 2010. Thus, rubber compounders will need to replace current aromatic oils in oil-extended ("OE") rubbers with alternative oils or look for other alternative processing aids.

Current industry PAH oil replacement options, such as treated distillate aromatic extracts ("TDAE") and mild extract solvates ("MES"), are limited in supply and have shown deficiencies such as reduced dynamic properties, reduced tire wet traction performance, reduced tear strength, and reduced tire durability (e.g., tire component-to-component adhesion may be less with TDAE and MES than with conventional aromatic oils). Therefore, a need exists for a replacement for processing oils, such as PAHs, in tire and tire tread compounds which will maintain beneficial compounding properties and without adversely impacting tire performance.

Conventional oil processing aids have been used in many tire components: tread compounds often contain polybutadiene rubber ("BR"), oil-extended polybutadiene rubber ("OE-BR"), styrene-butadiene rubber ("SBR"), oil-extended styrene-butadiene rubber ("OE-SBR"), isoprene-butadiene rubber ("IBR"), and styrene-isoprene-butadiene rubber ("SIBR"); sidewall and ply coats can contain butyl rubber and SBR and may use free aromatic oils as processing aids; internal components, such as the steel belt skim coat, gum strips, cushions, barriers, bases, and wedges, contain predominantly natural rubber and aromatic oils. Generally, the raw ingredients and materials used in tire compounding impact all tire performance variables, thus, any alternative to conventional processing oils must be compatible with the rubbers, not interfere with cure, be easily dispersed in all tire compounds, be cost effective, and not adversely impact tire performance.

As many tires are compounded and engineered for particular performance characteristics, it is desirable that any replacement for traditional aromatic oils maintains tire performance characteristics, such as rolling resistance, traction, and wear performance. There is a need for a replacement for aromatic oils in tire and tire tread compounds; in particular, there is a need for an aromatic oil replacement which allows for beneficial compound processability and does not adversely impact tire performance.

SUMMARY OF THE INVENTION

The present invention provides an elastomeric composition comprising at least one hydrocarbon polymer additive. The elastomeric compositions of the present invention are useful in a variety of applications such as pneumatic tire components, hoses, belts, solid tires, footwear components, rollers for graphic arts applications, vibration isolation devices, pharmaceutical devices, adhesives, sealants, protective coatings, and bladders for fluid retention and curing purposes.

Particularly provided are elastomeric compositions comprising at least one elastomer and a hydrocarbon polymer additive, wherein the hydrocarbon polymer additive comprises from 60 to 90 weight % piperylene, from 5 to 15 weight % cyclic components, and from 5 to 20 weight % styrenic components. Optionally, the elastomeric composition may also comprise, up to 5 weight % isoprene, up to 10 weight % amylene, and up to 5 weight % indenic components.

Also provided are elastomeric compositions comprising at least one elastomer and at least one hydrocarbon polymer additive, wherein the hydrocarbon polymer additive has a molecular weight of from 520 to 650 g/mole and a glass transition temperature (Tg) of from 45 to 55° C. The elastomeric compositions are particularly useful in making tires and other cured rubber articles.

The hydrocarbon polymer additives may be able to partially or fully replace aromatic process oils in tire manufacturing, while maintaining current tire performance parameters. Additionally, the use of the inventive hydrocarbon polymer additives in place of aromatic process oils may improve tire-vehicle traction performance, abrasion resistance (tread wear), and tire durability, while maintaining traction ratings. Alternatively, the hydrocarbon polymer additives may be blended with a naphthenic oil or paraffinic oil to maintain tire performance parameters of compositions containing aromatic oil.

These and other objects, features, and advantages will become apparent as reference is made to the following detailed description, preferred embodiments, examples, and appended claims.

DETAILED DESCRIPTION OF THE INVENTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components is present in a given recipe is always defined as 100 phr. All other non-rubber components are ratioed against the 100 parts of rubber and are expressed in phr.

All hydrocarbon polymer additive component percentages listed herein are weight %, unless otherwise noted. Substantially free of a hydrocarbon polymer additive component is defined to mean that the hydrocarbon polymer additive comprises less than 0.5 weight % of the component, or more preferably less than 0.25 weight % of the component, or most preferably less than 0.1 weight % of the component.

The term "elastomer," as used herein, refers to any polymer or combination of polymers consistent with the ASTM D1566 definition, incorporated herein by reference. As used herein, the term "elastomer" may be used interchangeably with the term "rubber."

The elastomeric compositions of the invention can include various elastomers, hydrocarbon polymer additives, and fillers. In one embodiment, the various elastomers are generally present in the elastomeric composition at 100 phr either alone, or in some combination with one another, with hydrocarbon polymer additive being present from 5 to 50 phr.

The hydrocarbon polymer additive preferably comprises from 60 to 90% piperylene, from 5 to 15% cyclic components, and from 5 to 20% styrenic components. The hydrocarbon polymer additive may optionally comprise up to 5% isoprene, up to 10% amylene, and up to 5% indenic components. In one embodiment there is only one hydrocarbon polymer additive. In another embodiment, two or more hydrocarbon polymer additives are blended. When two or more hydrocarbon polymer additives are used, the hydrocarbon polymer additive blend preferably comprises from 60 to 90% piperylene, from 5 to 15% cyclic components, and from 5 to 20% styrenic components. The hydrocarbon polymer additive blend may optionally comprise up to 5% isoprene, up to 10% amylene, and up to 5% indenic components. Preferably, the elastomeric composition comprises from 5 to 50 phr of hydrocarbon polymer additive or hydrocarbon polymer additive blend.

In one embodiment the elastomeric composition is used in a tire, such as in the tread, or other tire component. In tire construction and model tread formulations, the elastomeric composition may comprise: 100 phr of elastomer(s); from 50 to 90 phr of fillers such as, for example, carbon black and/or silica; from 5 to 50 phr of hydrocarbon polymer additive(s); optionally, about 3 phr of ZnO; optionally, about 1 phr of stearic acid; optionally, about 2 phr of accelerators; optionally, about 1 phr of sulfur; optionally, about 5 phr of other processing aids; and optionally, depending on the application, about 4 phr of antidegradants.

In some embodiments, the hydrocarbon polymer additive(s) can be used in addition to other processing aids and oils, or as a replacement for other processing aids and oils. Preferably, the elastomeric compositions are substantially free of aromatic oils. Substantially free of aromatic oils is defined to mean that the elastomeric composition comprises less than 0.5 phr of aromatic oil, or more preferably less than 0.25 phr of aromatic oil, or most preferably less than 0.1 phr of aromatic oil. Aromatic oils are compounds containing at least 35% by mass of single- and multiple-ring compounds. Generally, aromatic oils contain unsaturated polycyclic components.

In some embodiments replacing aromatic oil with hydrocarbon polymer additives can improve compound tack, adhesion, and tear strength; improve aged tensile strength retention; improve abrasion resistance and storage modulus, G'; and provide an increase in tan delta at 0° C., which can be used as an predictor for tire traction.

Elastomer

The elastomeric composition comprises at least one elastomer. Typical elastomers that may be included in the elastomeric compositions include butyl rubber, branched ("star-branched") butyl rubber, star-branched polyisobutylene rubber, random copolymers of isobutylene and para-methylstyrene(poly(isobutylene-co-p-methylstyrene)), polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber (SBR), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, and any halogenated versions of these elastomers and mixtures thereof. Useful elastomers can be made by any suitable means known in the art, and the invention is not herein limited by the method of producing the elastomer.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene.

In some embodiments, the elastomeric composition comprises a blend of two or more elastomers. Blends of elastomers may be reactor blends and/or melt mixes. The individual elastomer components may be present in various conventional amounts, with the total elastomer content in the elastomeric composition being expressed as 100 phr in the formulation.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ to $C_7$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers such as homopolymers and copolymers of olefins, isoolefins and multiolefins. These and other types of useful butyl rubbers are well known and are described in RUBBER TECHNOLOGY, p. 209-581 (Morton, ed., Chapman & Hall 1995), THE VANDERBILT RUBBER HANDBOOK, p. 105-122 (Ohm ed., R.T. Vanderbilt Col., Inc. 1990), and Kresge and Wang in 8 KIRK-OTHMER ENCYCLOPEDIA OF CHEMICAL TECHNOLOGY, p. 9340955 (John Wiley & Sons, Inc. 4th ed. 1993), each of which are incorporated herein by reference. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

In an embodiment the elastomer may be at least one non isobutylene based rubber of types conventionally used in tire rubber compounding, and herein referred to as "general purpose rubber." A general purpose rubber may be any rubber that usually provides high strength and good abrasion along with low hysteresis and high resilience. These elastomers may require antidegradants in the mixed compound if they have poor resistance to both heat and ozone.

Examples of general purpose rubbers include natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof. The elastomeric composition may also comprise rubbers of ethylene and propylene derived units such as ethylene-propylene rubber ("EP") and ethylene-propylene-diene rubber ("EPDM"), and their mixtures. EP and EPDM are may also be considered to be general purpose elastomers. Examples of suitable termonomers in making EPDM are ethylidene norbornene, 1,4-hexadiene, dicyclopentadiene, as well as others.

In one embodiment, the elastomer may include a polybutadiene (BR) rubber. The Mooney viscosity of the polybutadiene rubber as measured at 100° C. (ML 1+4, ASTM D1646) may range from 35 to 70, or from 40 to about 65, or in another embodiment from 45 to 60.

Another useful synthetic rubber is high cis-polybutadiene ("cis-BR"). By "cis-polybutadiene" or "high cis-polybutadiene", it is meant that 1,4-cis polybutadiene is used, wherein the amount of the cis component is at least 95%.

The elastomeric composition may also comprise a polyisoprene (IR) rubber. The Mooney viscosity of the polyisoprene rubber as measured at 100° C. (ML 1+4, ASTM D1646) may range from 35 to 70, or from 40 to about 65, or in another embodiment from 45 to 60.

In another embodiment, the elastomer may also comprise a natural rubber. Natural rubbers are described in detail by Subramaniam in RUBBER TECHNOLOGY, p 179-208 (Morton, ed., Chapman & Hall, 1995), herein incorporated by reference. Desirable embodiments of the natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) of from 30 to 120, or more preferably from 40 to 80.

The elastomers useful in the invention can be blended with various other rubbers or plastics, in particular thermoplastic resins such as nylons or polyolefins such as polypropylene or copolymers of polypropylene. These compositions are useful in air barriers such as bladders, tire innertubes, tire innerliners, air sleeves (such as in air shocks), diaphragms, as well as other applications where high air or oxygen retention is desirable.

Hydrocarbon Polymer Additives ("HPA")

The elastomeric composition further comprises a hydrocarbon polymer additive ("HPA"). HPAs useful in this invention include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the HPA is hydrogenated. In other embodiments the HPA is non-polar. (Non-polar meaning that the HPA is substantially free of monomers having polar groups)

HPAs can be used as elastomer compounding materials. Depending on how the HPA is compounded, optimization of rubber characteristics for rubber and tire durability, traction, and abrasion resistance can be achieved. The macrostructure (molecular weight, molecular weight distribution, and branching) of the HPA provides unique properties to the polymer additive.

Suitable HPAs may include both aromatic and nonaromatic components. Differences in the HPAs are largely due to the olefins in the feedstock from which the hydrocarbon components are derived. The HPA may contain "aliphatic" hydrocarbon components which have a hydrocarbon chain formed from $C_4$-$C_6$ fractions containing variable quantities of piperylene, isoprene, mono-olefins, and non-polymerizable paraffinic compounds. Such HPAs are based on pentene, butane, isoprene, piperylene, and contain reduced quantities of cyclopentadiene or dicyclopentadiene. The HPA may also contain "aromatic" hydrocarbon structures having polymeric chains which are formed of aromatic units, such as styrene, xylene, α-methylstyrene, vinyl toluene, and indene.

In accordance with the present invention, the HPA used in rubber compounding includes olefins such as piperylene, isoprene, amylenes, and cyclic components. The HPA may also contain aromatic olefins such as styrenic components and indenic components.

Piperylenes are generally a distillate cut or synthetic mixture of $C_5$ diolefins, which include, but are not limited to, cis-1,3-pentadiene, trans-1,3-pentadiene, and mixed 1,3-pentadiene. In general, piperylenes do not include branched $C_5$ diolefins such as isoprene. In one embodiment, the HPA has from 40 to 90% piperylene, or from 50 to 90%, or more preferably from 60 to 90%. In a particularly preferred embodiment, the HPA has from 70 to 90% piperylene.

In one embodiment, the HPA is substantially free of isoprene. In another embodiment, the HPA contains up to 15% isoprene, or less than 10% isoprene. In yet another embodiment, the HPA contains less than 5% isoprene.

In one embodiment, the HPA is substantially free of amylene. In another embodiment, the HPA contains up to 40% amylene, or less than 30% amylene, or less than 25% amylene. In yet another embodiment, the HPA contains up to 10% amylene.

Cyclics are generally a distillate cut or synthetic mixture of $C_5$ and $C_6$ cyclic olefins, diolefins, and dimers therefrom. Cyclics include, but are not limited to, cyclopentene, cyclopentadiene, dicyclopentadiene, cyclohexene, 1,3-cyclohexadiene, and 1,4-cyclohexadiene. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups. In one embodiment the HPA may include up to 60% cyclics or up to 50% cyclics. Typical lower limits include at least about 0.1% or at least about 0.5% or from about 1.0% cyclics are included. In at least one embodiment, the HPA may include up to 20% cyclics or more preferably up to 30% cyclics. In a particularly preferred embodiment, the HPA comprises from about 1.0 to about 15% cyclics, or from about 5 to about 15% cyclics.

Preferred aromatics that may be in the HPA include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. The aromatic olefins are typically present in the HPA from 5 to 45%, or more preferably from 5 to 30%. In particularly preferred embodiments, the HPA comprises from 10 to 20% aromatic olefins.

Styrenic components include styrene, derivatives of styrene, and substituted sytrenes. In general, styrenic components do not include fused-rings, such as indenics. In one embodiment, the HPA comprises up to 60% styrenic components or up to 50% styrenic components. In one embodiment, the HPA comprises from 5 to 30% styrenic components, or from 5 to 20% styrenic components. In a preferred embodiment, the HPA comprises from 10 to 15% styrenic components.

The HPA may comprise less than 15% indenic components, or less than 10% indenic components. Indenic components include indene and derivatives of indene. In one embodiment, the HPA comprises less than 5% indenic components. In another embodiment, the HPA is substantially free of indenic components.

Preferred HPAs have melt viscosity of from 300 to 800 centipoise (cPs) at 160° C., or more preferably of from 350 to 650 cPs at 160° C. In a particularly preferred embodiment, the HPA's melt viscosity is from 375 to 615 cPs at 160° C., or from 475 to 600 cPs at 160° C. The melt viscosity may be measured by a Brookfield viscometer with a type "J" spindle, ASTM D6267.

Generally HPA's have a weight average molecular weight (Mw) greater than about 600 g/mole or greater than about 1000 g/mole. In at least one embodiment, HPAs have a weight average molecular weight (Mw) of from 1650 to 1950 g/mole, or from 1700 to 1900 g/mole. Preferably HPA's have a weight average molecular weight of from 1725 to 1890 g/mole. The HPA may have a number average molecular weight (Mn) of from 450 to 700 g/mole, or from 500 to 675 g/mole, or more preferably from 520 to 650 g/mole. The HPA may have a z-average molecular weight (Mz) of from 5850 to 8150 g/mole, or more preferably from 6000 to 8000 g/mole. Mw, Mn, and Mz may be determined by gel permeation chromatography (GPC).

In one embodiment the HPA has a polydispersion index ("PDI", PDI=Mw/Mn) of 4 or less. In a particularly preferred embodiment the HPA has a PDI of from 2.6 to 3.1.

Preferred HPAs have a glass transition temperature (Tg) of from about −30° C. to about 100° C., or from about 0° C. to 80° C, or from about 40-60° C, or from 45-55° C., or more preferably of from 48-53° C. Differential scanning calorimetry (DSC) may be used to determine the HPA's Tg.

The resins described above may be produced by methods generally known in the art for the production of HPAs, and the invention is not limited by the method of forming the HPA. Preferably the HPA is produced by combining the olefin feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In another embodiment the HPA may be hydrogenated. The hydrogenation of the HPA may be carried out by any method known in the art, and the invention is not limited by the method of hydrogenation. For example, the hydrogenation of the HPA may be either a batchwise or a continuous process. Preferably the HPA is catalytically hydrogenated. Catalysts employed for the hydrogenation of HPAs are typically supported monometallic and bimetallic catalyst systems based on elements from Group 6, 8, 9, 10, or 11 of the Periodic Table of Elements.

An example of a useful hydrocarbon polymer additive is the Oppera™ series of polymeric additives commercially available from ExxonMobil Chemical Company.

Fillers and Additives

The elastomeric compositions produced in accordance with the present invention typically contain other components and additives customarily used in rubber compounds, such as effective amounts of other processing aids, pigments, accelerators, cross-linking and curing materials, antioxidants, antiozonants, fillers, and/or clays. In addition to HPA the elastomeric compositions may optionally include other useful processing aids such as, for example, plastomers, polybutene, or mixtures thereof.

In addition to comprising at least one elastomer and at least one hydrocarbon polymer additive, the elastomeric compositions may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically range, for example in the tire industry, from about 0.0001 μm to about 100 μm.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent such as organic molecules; the layered clay may comprise at least one silicate.

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the above discussed silicates are also contemplated.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be added as an additive to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In one embodiment, one or more silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and the like, and mixtures thereof.

The filler may be carbon black or modified carbon black. The filler may also be a blend of carbon black and silica. In one embodiment, the elastomeric composition is a tire tread or sidewall and comprises reinforcing grade carbon black at a level of from 10 to 100 phr of the blend, more preferably from 30 to 80 phr in another embodiment, and in yet another embodiment from 50 to 80 phr. Useful grades of carbon black include the ranges of from N110 to N990.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the polymer's mechanical properties. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from 150° C. to 200° C. in another embodiment, for about 1 to 150 minutes.

Halogen-containing elastomers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-tertiarybutyl-2-benzothiazole sulfenamide (TBBS), N-cyclohexyl-2-benzothiazole-sulfenamide (CBS), and thioureas.

In one embodiment of the invention, at least one curing agent(s) is present from 0.2 to 10 phr, or from 0.5 to 5 phr, or in another embodiment from 0.75 phr to 2 phr.

Processing

The inventive elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In a further embodiment, mixing with the clays is performed by techniques known to those skilled in the art, wherein the clay is added to the polymer at the same time as the carbon black. In other embodiments, additional stages may involve incremental additions of one or more fillers.

In another embodiment, mixing of the components may be carried out by combining the elastomer components, filler and clay in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow the clay to exfoliate and become uniformly dispersed within the elastomer(s).

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, is typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

In one embodiment, the elastomer is blended with at least one hydrocarbon polymer additive, wherein the total hydrocarbon polymer additive content comprises from 60% to 90% piperylene, from 5% to 15% cyclic components, from 5% to 20% styrenic components,. In another embodiment, the elastomer is blended with a second hydrocarbon polymer additive that is different from the first hydrocarbon polymer additive, and the total hydrocarbon polymer additive content comprises from 60% to 90% piperylene, from 5% to 15% cyclic components, from 5% to 20% styrenic components up to 5% isoprene, up to 10% amylene, and up to 5% indenic components.

Industrial Applicability

The elastomeric compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as an innerliner for a tire. The article may be selected from air barriers, air membranes, films, layers (microlayers and/or multilayers), innerliners, innertubes, air sleeves, sidewalls, treads, tire curing bladders, and the like. The elastomeric composition may be particularly useful in a tire tread.

The elastomeric compositions of the present invention are useful in a variety of applications, particularly pneumatic tire components, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

In other embodiments, also provided are:

A. An elastomeric composition comprising:
at least one elastomer; and
a hydrocarbon polymer additive, wherein the hydrocarbon polymer additive comprises from 60% to 90% piperylene, from 0.1% to 15% cyclic components, and from 0.1% to 20% styrenic components.

B. An elastomeric composition comprising:
at least one elastomer; and
a hydrocarbon polymer additive, wherein the hydrocarbon polymer additive comprises from 60% to 90% piperylene, from 5% to 15% cyclic components, and from 5% to 20% styrenic components.

C. The composition of embodiment A or B, wherein at least one elastomer is selected from the group consisting of butyl rubber, halogenated butyl rubber, branched ("star-branched") butyl rubber, halogenated star-branched butyl rubber, poly (isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

D. The composition of any of embodiments A-C, wherein the hydrocarbon polymer additive is present from 5 to 50 phr.

E. The composition of any of embodiments A-D, wherein the hydrocarbon polymer additive further comprises up to 5% of isoprene.

F. The composition of any of embodiments A-E, wherein the hydrocarbon polymer additive further comprises up to 5% indenic components.

G. The composition of any of embodiments A-F, wherein the hydrocarbon polymer additive further comprises up to 10% amylene.

H. The composition of any of embodiments A-G, wherein the elastomeric composition further comprises one or more filler components selected from calcium carbonate, clay, mica, silica, silicates, talc, titanium dioxide, starch and other organic fillers such as wood flour, carbon black, and mixtures thereof.

I. The composition of any of embodiments A-H, wherein the elastomeric composition is cured.

J. The composition of any of embodiments A-I, wherein the elastomeric composition is substantially free of aromatic oil.

K. A cured elastomeric rubber article comprising an elastomer and a hydrocarbon polymer additive, wherein the hydrocarbon polymer additive comprises from 60% to 90% piperylene, from 0.1% to 15% cyclic components, and from 0.1% to 20% styrenic components.

L. A cured elastomeric rubber article comprising an elastomer and a hydrocarbon polymer additive, wherein the hydrocarbon polymer additive comprises from 60% to 90% piperylene, from 5% to 15% cyclic components, and from 5% to 20% styrenic components. The article of claim K, wherein the cured elastomeric rubber article is a tire or tire component.

M. The article of embodiments K or L, wherein the hydrocarbon polymer additive further comprises up to 5% isoprene.

N. The article of any of embodiments K or M, wherein the hydrocarbon polymer additive further comprises up to 10% amylene.

O. The article of any of embodiments K or N, wherein the hydrocarbon polymer additive further comprises up to 5% indenic components.

P. An elastomeric composition comprising:
at least one elastomer; and
a hydrocarbon polymer additive, wherein the hydrocarbon polymer additive has a molecular weight of at least about 600 g/mole and a Tg of at least about 0° C.

Q. An elastomeric composition comprising:
at least one elastomer; and
a hydrocarbon polymer additive, wherein the hydrocarbon polymer additive has a molecular weight of from 520 g/mole to 650 g/mole and a Tg of from 48° C. to 53° C.

R. The elastomeric composition of embodiments P or Q, wherein at least one elastomer is selected from the group consisting of butyl rubber, halogenated butyl rubber, branched ("star-branched") butyl rubber, halogenated star-branched butyl rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

S. The elastomeric composition of any of embodiments P-R, wherein the elastomeric composition is cured.

T. The elastomeric composition of any of embodiments P-S, wherein the cured elastomeric composition is a tire or a tire component.

U. The process of blending an elastomer with at least one hydrocarbon polymer additive, wherein the total hydrocarbon polymer additive content comprises from 60% to 90% piperylene, from 0.1% to 15% cyclic components, from 0.1% to 20% styrenic components, and up to 5% isoprene, up to 10% amylene, and up to 5% indenic components.

V. The process of blending an elastomer with at least one hydrocarbon polymer additive, wherein the total hydrocarbon polymer additive content comprises from 60% to 90% piperylene, from 5% to 15% cyclic components, from 5% to 20% styrenic components, and up to 5% isoprene, up to 10% amylene, and up to 5% indenic components.

W. The process of embodiment U or V, wherein the elastomer is blended with a second hydrocarbon polymer additive that is different from the first hydrocarbon polymer additive.

EXAMPLES

The elastomeric compositions comprising at least one elastomer and hydrocarbon polymer additives will now be further described with reference to the following non-limiting examples.

Cure properties were measured using an MDR 2000 from Alpha Technologies, Inc. at the indicated temperature and 0.5 degree arc, based on ASTM D-2084. Test specimens were cured at the indicated temperature, typically from 150° C. to 160° C., for a time (in minutes) corresponding to t90+appropriate mold lag. When possible, standard ASTM tests were used to determine the cured compound physical properties. Stress/strain properties (tensile strength, elongation at break, modulus values, energy to break) were measured at room temperature using an Instron 4202 or an Instron Series IX Automated Materials Testing System 6.03.08. Tensile strength measurements were made at ambient temperature; the specimens (dog-bone shaped) had a width of 0.25 inches (0.62 cm) and a length of 1.0 inches (2.5 cm) length (between two tabs). Though the thickness of the test specimen was a nominal 2.00 mm, the thickness of the specimens varied and was measured manually by a Mitutoyo Digimatic Indicator connected to the system computer. The specimens were pulled at a crosshead speed of 20 inches/min (51 cm/min.) and the stress/strain data was recorded. The average stress/strain value of at least three specimens is reported. The error ($2\sigma$) in Tensile measurements is ±0.47 MPa. The error ($2\sigma$) in measuring 100% Modulus is ±0.11 MPa; the error ($2\sigma$) in measuring elongation is ±13%.

Shore A hardness was measured at room temperature using a Zwick Duromatic. Abrasion loss was determined at room temperature by weight difference by using an APH-40 Abrasion Tester with rotating sample holder (5 N counter balance) and rotating drum. Weight losses were indexed to that of the standard DIN compound with lower losses indicative of a higher abrasion resistance index.

The values "MH" and "ML" used herein refer to "maximum torque" and "minimum torque", respectively. The "MS" value is the Mooney scorch value, the "ML(1+4)" value is the Mooney viscosity value. The error ($2\sigma$) in the Mooney viscosity measurement is ±0.65. The values of "Tc" are cure times in minutes, and "Ts" is scorch time in minutes.

Dynamic properties (G*, G', G", and tan delta) were determined using a MTS 831 mechanical spectrometer for pure shear specimens (double lap shear geometry) at temperatures of 0° C. and 60° C., using a 1 Hz and 10 Hz frequency at 2% strain. A rectangular torsion sample geometry was tested at 1 Hz and appropriate strain. Values of G" or tan delta measured at 0° C. in laboratory dynamic testing can be used as predictors of tire traction (wet traction performance of tread compounds) for carbon-black filled BR/SBR (styrene-butadiene rubber) compounds. Dynamic tan delta values at 60° C. can be used as an indicator of the tire tread compound's contribution to rolling resistance. The complex modulus value (G*) measured at 60° C. is used as a lab predictor of the dry handling, or cornering coefficient, characteristics of the tread component on the tire. A higher value is needed when a higher speed rated tire (i.e., H-, V-, Z-rated) is desirable.

Shear stress at a shear rate of 100 sec$^{-1}$ can be used to represent cold feed tread extruder conditions and allow for optimization of processing properties for specific factory conditions.

Molecular weight of the hydrocarbon polymer additives was determined by gel permeation chromatography. The techniques for determining the molecular weight (Mn, Mw, and Mz) and molecular weight distribution (MWD) are generally described in U.S. Pat. No. 4,540,753, which is incorporated herein by reference. The polydispersion index (PDI) was calculated as Mw/Mn. The melt viscosity of the hydrocarbon polymer additives was determined using a Brookfield viscometer with a type "J" spindle, ASTM D-6267.

The adhesion to natural rubber test, or the "adhesion to SBR" or "adhesion T-peel" test is based on ASTM D-413. This test is used to determine the adhesive bond strength between two rubber compounds after curing. Generally, the rubber compounds are prepared on a three-roll mill to a thickness of 2.5 mm. An adhesive backing fabric is placed on the back of each compound. Typically, approximately 500 grams of stock blended elastomeric composition yields 16 samples which is enough for 8 adhesion tests in duplicate, wherein the calendar is set to 2.5 mm guides spaced 11 cm apart.

The face of the two compounds are pressed and bonded to one another. A small Mylar tab is placed between the two layers of rubber compositions (SBR and test composition) on one end to prevent adhesion, and to allow approximately 2.5 inches (6.35 cm) of tab area. The samples are then cure bonded in a curing press at the specified conditions. Die out 1 inch (2.54 cm)×6 inch (15.24 cm) specimen from each molded vulcanized piece. The tab of each specimen is held by a powered driven tensioning machine (Instron 4104, 4202, or 1101) and pulled at 180° until separation between the two rubber compositions occurs. Force to obtain separation and observations are then reported.

Other test methods are listed in Table 1.

TABLE 1

Test Methods

| Parameter | Units | Test |
|---|---|---|
| Tg | °C. | DSC |
| Mooney Viscosity (composition) | ML 1 + 4, 100° C., MU | ASTM D1646 |
| Moving Die Rheometer (MDR) @160° C., ± 0.5°arc | | |
| ML | deciNewton.meter | ASTM D5289 |
| MH | dNewton.m | |
| ts2 | minutes | |
| t50 | minutes | |
| t90 | minutes | |
| Capillary Rheometer | | ASTM D 5099 |
| Physical Properties, press cured Tc 90 + 2 min @ 160° C. | | |
| Hardness | Shore A | ASTM D2240 |
| Modulus 20%, 100%, 300% | MPa | ASTM D412 die C |
| Tensile Strength | MPa | |
| Elongation at Break | % | |
| Die B Tear | N/mm | ASTM D624 |
| Rebound | | ISO 4662, DIN 53512 |
| Fatigue to Failure | 136% strain | ASTM D412 die C |

The hydrocarbon polymer additives used in the examples are complex copolymers where the copolymer properties can be controlled by the type and amount of monomers included, i.e., the copolymer's microstructure. Monomer placement in the polymer chain is random leading to further complexity in the polymer microstructure. Table 2 lists typical ranges for the type and amounts of monomers which define the hydrocarbon polymer additives used in the examples. The structures shown in Table 2 are representative only, and are not limiting. Typical physical and chemical properties of hydrocarbon polymer additives used in the examples are listed in Table 3.

TABLE 2

HPA Monomer Types, Concentration Ranges, and Representative Chemical Structures

| | HPA A | HPA B | Representative Structure |
|---|---|---|---|
| %-Piperylene (P) | 50-90 | 60-90 | |
| %-Isoprene (I) | 0-5 | 0-5 | |
| %-Amylenes (A) | 10-30 | 0-10 | |
| %-Cyclics (C) | 0-5 | 5-15 | |
| %-Styrenic (St) | 0-10 | 5-20 | |
| %-Indenic (In) | 0-10 | 0-5 | |

TABLE 3

HPA Physical and Chemical Property Ranges.

| | Melt Viscosity at 160° C. (cPs) | Mn (g/mole) | Mw (g/mole) | Mz (g/mole) | PDI | Tg ° C. |
|---|---|---|---|---|---|---|
| HPA A | 375-515 | 700-900 | 1400-1800 | 3000-5000 | 1.5-2.5 | 45-50 |
| HPA B | 375-615 | 520-650 | 1725-1890 | 6000-8200 | 2.6-3.1 | 48-53 |

A listing of various components used in the elastomeric compositions of the examples is in Table 4.

TABLE 4

Various Components in the Elastomeric Compositions

| Material | Brief Description | Source | Commercial Name |
|---|---|---|---|
| Natural Rubber | Elastomer | Various sources | TSR 20 |
| SSBR OE 21% B.S. | Oil extended solution SBR 21% bound styrene. | Firestone Polymers | Duradene 763A |
| SSBR 20% B.S. | Solution SBR 20% bound styrene. | Firestone Polymers | Duradene 739 |
| Polybutadiene | Neodymium BR | Firestone Polymers | Diene 140ND |
| SBR 1500 | Emulsion SBR | Various sources | IISRP SBR 1500 grade |
| Renacit 11 | Peptizer; 2,2'-dibenzamido-diphenyldisulfide | Lanxess | Renacit 11 |
| HDS Silica | Highly dispersible silica | Degussa | Ultrasil 7000 |

TABLE 4-continued

Various Components in the Elastomeric Compositions

| Material | Brief Description | Source | Commercial Name |
|---|---|---|---|
| X50S | Silane coupling a blend of N330 carbon black and TESPT bis-(triethoxylsilylpropyl tetrasulfide). | Degussa | X50S |
| N234 | Carbon black | Sid Richardson | — |
| TMQ | Antioxidant; 2,2,4-trimethyl-1,2-dihydroquinoloine polymer | Flexsys | Flectol TMQ |
| 6PPD | Antiozonant; 1,3-dimethylbutyl-N'-phenyl-p-phenylene diamine | Flexsys | Santoflex 6PPD |
| Naphthenic Oil | Process oil | Calument | Calsol 810 |
| Aromatic Oil | Process Oil | Sunoco | Sundex 8125 |
| ZnO | Curative; Zinc Oxide | Zinc Corp of America | Kadox 9111 |
| Stearic Acid | Activator | Witco Manufacturing | ACI 5106NF |
| CBS | Accelerator; N-cyclohexyl-2-benzothiazole-sulfenamide | Flexsys | Santocure CBS |
| TBBS | Accelerator; tert-Butyl-2-benzothiazole sulfonamide | Flexsys | Santocure TBBS |
| DPG | Accelrator; Dipheynl guanidine | Flexsys | Perkacit DPG |
| Sulfur | Crosslinking Agent | RE Carroll | Rubermakers Sulfur |
| PVI | Vulcanization Retarder; cyclohexylthio phthalmide | Flexsys | Santogard PVI |
| HPA A | HPA with about 60% piperylene, about 3% isoprene, about 22% amylene, about 3% cyclics, about 6% styrene, and about 6% indene. Melt viscosity at 160° C. of 436 cPs; Mn of 855 g/mole; Mw of 1595 g/mole; Mz of 3713 g/mole; PDI of 1.9; and Tg of 47° C. | ExxonMobil Chemical Company | Oppera ™ PR373N |
| HPA B | HPA with about 80% piperylene, about 8% cyclics, and about 12% styrenic. Melt viscosity at 160° C. of 583 cPs; Mn of 607 g/mole; Mw of 1744 g/mole; Mz of 8070 g/mole; PDI of 2.8; Tg of 51° C. | Exxon Mobil Chemical Company | Oppera ™ 394A |

Example 1

In Example 1, model silica tread compounds were produced. The compounds were prepared using a Krupp 1.0 liter capacity laboratory mixer with intermeshing rotors. The non-productive mix cycle was as follows: 1) mixer rotor speed was set at 80 RPM with a ram pressure of 60 psi; 2) add elastomers, all silica, silane coupling agent, oils or hydrocarbon polymer additives, and free powders, lower the ram; 3) mix to a temperature of 160° C. or 5 minutes maximum and then drop the batch from the mixer. The productive or second stage was added to the mixer with the vulcanization system ingredients. The compound was mixed to 100° C. to 105° C. or 90 seconds in the mixer, dropped, then sheeted on a 2-roll mill.

The formulations for the model silica tread compounds of Example 1 are listed in Table 5, all amounts listed are in phr. In compounds 2 and 3, hydrocarbon polymer additives (HPA A and HPA B) were used in the place of aromatic oil. The hydrocarbon polymer additives and aromatic oil were added into their respective compounds at 40 phr. This represents a high loading level but is intended to demonstrate the properties that can be achieved when replacing aromatic oil with hydrocarbon polymer additives. The compounds were tested for a range of processing, curing, and physical properties such as tensile strength and tear strength. The data is presented in Table 6.

TABLE 5

Model Silica Tread Formulation

| | Compound | | |
|---|---|---|---|
| | 1 | 2 | 3 |
| SSBR - OE. 21% B.S. | 68.75 | 68.75 | 68.75 |
| SSBR 20% B.S. | 20.00 | 20.00 | 20.00 |
| Polybutadiene | 30.00 | 30.00 | 30.00 |
| Silica (HDS) | 80.00 | 80.00 | 80.00 |
| X50S | 12.80 | 12.80 | 12.80 |
| TMQ | 1.00 | 1.00 | 1.00 |
| 6PPD | 1.50 | 1.50 | 1.50 |
| Wax, Paraffin | 1.50 | 1.50 | 1.50 |
| ZnO (zinc oxide) | 3.00 | 3.00 | 3.00 |
| Stearic acid | 2.00 | 2.00 | 2.00 |
| Aromatic Oil | 40.00 | | |
| HPA A | | 40.00 | |
| HPA B | | | 40.00 |
| CBS | 1.75 | 1.75 | 1.75 |
| DPG | 2.00 | 2.00 | 2.00 |
| Sulfur | 1.50 | 1.50 | 1.50 |
| PVI | 0.15 | 0.15 | 0.15 |

TABLE 6

Properties of HPA Products in the Model Silica Tread Formulation

|  |  | Compound | | |
|---|---|---|---|---|
|  |  | 1 | 2 | 3 |
| Mooney Viscosity at 100° C. | | | | |
| ML 1 + 4 | [MU] | 40.7 | 44.7 | 50.1 |
| MDR Rheometer | | | | |
| Test Temperature | [° C.] | 160 | 160 | 160 |
| MH-ML | [dNm] | 11.3 | 10.0 | 9.3 |
| t10 | [Min] | 1.8 | 1.6 | 1.7 |
| t90 | [Min] | 20.0 | 21.8 | 21.6 |
| Peak Rate | [dNm/min] | 1.6 | 1.3 | 1.2 |
| Tensile Strength | [MPa] | 18.0 | 16.9 | 18.4 |
| Elongation | [%] | 588 | 588 | 592 |
| 300% Modulus | [MPa] | 7.15 | 4.3 | 6.9 |
| Hardness | [ShoreA] | 56 | 50 | 51 |
| Die B Tear (Peak) | [N] | 151 | 154 | 140 |
| (to ASTM D624) | | | | |
| DIN Abrasion ARI | | 99 | 90 | 81 |
| Rebound | [° C.] | 32 | 16 | 16 |
| Freq | Hz | 10 | 10 | 10 |
| Temp | [° C.] | 0 | 0 | 0 |
| G' | MPa | 13.81 | 21.5 | 17.02 |
| tan delta | | 0.458 | 0.730 | 0.752 |

The substitution of aromatic oil with HPAs had little effect on tensile strength, 300% modulus, compound hardness, and tear strength. The rebound decreased with the addition of HPA, suggesting an improvement in tire traction performance. The storage modulus, G' (measured at 0° C., 2% strain and 10 Hz), increased with the addition of HPA. Within an operating window, higher values of G' suggest better resistance to tire tread irregular wear. Better resistance to irregular wear suggests that the tire will display better overall wear performance and less susceptibility to the creation of vibration conditions in the vehicle on which the tire is mounted.

Example 2

In Example 2, model carbon black loaded tread compounds were produced. The two hydrocarbon polymer additives, HPA A and HPA B, were added in the place of either naphthenic oil or aromatic oil in compounds 3 and 4. The formulations for the model carbon black loaded tread compounds are listed in Table 7; all amounts listed are in phr.

TABLE 7

Model Carbon Black Loaded Tread Compounds

|  | Compound | | | |
|---|---|---|---|---|
|  | 1 | 2 | 3 | 4 |
| Natural Rubber (SMR 20) | 30.00 | 30.00 | 30.00 | 30.00 |
| SSBR 20% B.S. | 70.00 | 70.00 | 70.00 | 70.00 |
| N234 | 75.00 | 75.00 | 75.00 | 75.00 |
| Wax | 1.50 | 1.50 | 1.50 | 1.50 |
| TMQ | 1.00 | 1.00 | 1.00 | 1.00 |
| 6PPD | 3.00 | 3.00 | 3.00 | 3.00 |
| Stearic acid | 2.00 | 2.00 | 2.00 | 2.00 |
| ZnO | 3.00 | 3.00 | 3.00 | 3.00 |
| Aromatic Oil | 40.00 | | | |
| Naphthenic Oil | | 40.00 | | |
| HPA A | | | 45.00 | |
| HPA B | | | | 45.00 |
| CBS | 1.75 | 1.75 | 1.75 | 1.75 |
| DPG | 0.40 | 0.40 | 0.40 | 0.40 |
| Sulfur | 1.50 | 1.50 | 1.50 | 1.50 |
| PVI | 0.10 | 0.10 | 0.10 | 0.10 |

The compounds were mixed using a Farrel BR size laboratory internal mixer following a mix cycle similar to that used for the model silica tread compounds in Example 1 but where the compound non-productive drop temperature was set at 170° C.

The results from the compound tests are listed in Table 8. The compounds containing the HPAs had similar mechanical properties, such as compound hardness, tensile strength, and 300% modulus, as the compounds containing either aromatic oil or naphthenic oil. Tear strength was higher for the compounds containing the HPAs.

TABLE 8

Properties of HPA Products in the Model carbon Black Loaded Tread Formulation

| Compound |  | 1 | 2 | 3 | 4 |
|---|---|---|---|---|---|
| Mooney Viscosity at 100° C. | | | | | |
| ML 1 + 4 | [MU] | 50.7 | 44.4 | 67.5 | 68.6 |
| MDR Rheometer | | | | | |
| Test Temp | [° C.] | 160 | 160 | 160 | 160 |
| MH-ML | [dNm] | 10.55 | 10.86 | 9.36 | 9.34 |
| t10 | [Min] | 3.0 | 2.7 | 3.4 | 3.8 |
| t90 | [Min] | 6.7 | 6.3 | 6.6 | 7.0 |
| Peak Rate | [dNm/min] | 6.98 | 6.88 | 5.4 | 5.15 |
| Tensile Strength | [MPa] | 15.0 | 15.1 | 16.5 | 17.7 |
| Elongation | [%] | 464 | 494 | 581 | 611 |
| 300% Modulus | [MPa] | 8.4 | 8.0 | 7.2 | 7.6 |
| Hardness A | [Shore A] | 59 | 59 | 62 | 63 |
| Tear Strength | [N/mm] | 57.8 | 65.4 | 66.9 | 69.1 |

Example 3

In Example 3, HPA A and HPA B, were evaluated in model tread silica tread compounds where the loading was reduced to 30 phr. The compounds were mixed in a conventional Farrell BR laboratory internal mixer. The mix cycle was similar to that followed for the Krupp internal mixer with final non-productive drop temperatures set at 160° C. or a mix time of 5 minutes. The formulations for the model tread silica tread compounds of Example 3 are listed in Table 9; all amounts listed are in phr.

TABLE 9

Model Silica Tread Formulations Containing HPA Additives

|  | Compound | | | |
|---|---|---|---|---|
|  | 1 | 2 | 3 | 4 |
| SSBR - OE. 21% B.S. | 68.75 | 68.75 | 68.75 | 68.75 |
| SSBR 20% B.S. | 20.00 | 20.00 | 20.00 | 20.00 |
| Polybutadiene | 30.00 | 30.00 | 30.00 | 30.00 |
| Silica (HDS) | 80.00 | 80.00 | 80.00 | 80.00 |
| X50S | 12.80 | 12.80 | 12.80 | 12.80 |
| TMQ | 1.00 | 1.00 | 1.00 | 1.00 |
| 6PPD | 1.50 | 1.50 | 1.50 | 1.50 |
| Wax | 1.50 | 1.50 | 1.50 | 1.50 |
| ZnO | 3.00 | 3.00 | 3.00 | 3.00 |
| Stearic Acid | 2.00 | 2.00 | 2.00 | 2.00 |
| Aromatic Oil | 30.00 | | | |
| Naphthenic Oil | | 30.00 | | |
| HPA A | | | 30.00 | |
| HPA B | | | | 30.00 |
| CBS | 1.75 | 1.75 | 1.75 | 1.75 |
| DPG | 2.00 | 2.00 | 2.00 | 2.00 |
| Sulfur | 1.50 | 1.50 | 1.50 | 1.50 |
| PVI | 0.15 | 0.15 | 0.15 | 0.15 |

The compound test results are listed in Table 10. It can be seen that compound Mooney viscosity increases by 6 to 9 Mooney units when the HPAs were used to replace either aromatic oil or naphthenic oil. Within this range of increase, this would not lead to an increase in processing difficulties in a tire factory. Had the Mooney viscosity reached 75 to 80 Mooney units, then difficulties might be anticipated. The Mooney viscosity test is conducted at 100° C. and a shear rate of 1 to 2 sec$^{-1}$. In an industrial cold feed tire tread extruder, compound shear rates are closer to 100 sec$^{-1}$. Using a Dynisco ARC2000 capillary rheometer, compound shear stress at 100° C. at a shear rate of 100 sec$^{-1}$ was measured. From Table 10 it can be seen that the shear stress is well below 400 KPa (366 and 362 KPa respectively) again suggesting the compounds will perform in a satisfactory manner during a tread extrusion operation.

TABLE 10

Comparison of Naphthenic Oil, Aromatic Oil and HPA Polymer Additives in the Model Silica Tread Compound

| Compound | | 1 | 2 | 3 | 4 |
|---|---|---|---|---|---|
| Mooney Viscosity | | | | | |
| ML 1 + 4 | [MU] | 53 | 51 | 59 | 62 |
| Capillary Rheometer | | | | | |
| Test Temp | [° C.] | 100 | 100 | 100 | 100 |
| Shear Rate | [/sec] | 100 | 100 | 100 | 100 |
| Shear Stress | KPa | 305 | 325 | 366 | 362 |
| MDR Rheometer | | | | | |
| Test Temp | [° C.] | 160 | 160 | 160 | 160 |
| MH-ML | [dNm] | 18.5 | 17.1 | 16.2 | 16.6 |
| t10 | [Min] | 2.1 | 1.3 | 1.3 | 1.0 |
| t90 | [Min] | 25.4 | 27.8 | 20.9 | 24.6 |
| Tensile Strength | [MPa] | 18.1 | 15.7 | 18.6 | 18.5 |
| Elongation | [%] | 587 | 485 | 592 | 560 |
| 300% Modulus | [MPa] | 7.8 | 8.6 | 7.8 | 8.4 |
| Hardness A | [Shore A] | 67 | 65 | 65 | 69 |
| Tear Strength | [N/mm] | 69 | 66 | 74 | 72 |
| Rebound | 23° C. | 28 | 32 | 18 | 19 |
| DIN Abrasion | | 150 | 129 | 128 | 109 |
| Fatigue to Failure | 136% strain | | | | |
| Test Temp | [° C.] | 23 | 23 | 23 | 23 |
| Average Cycles | | 14078 | 8535 | 15844 | 13321 |
| Adhesion to Natural Rubber Compound | | 30.7 | 31.1 | 31.6 | 32.3 |
| G' (0° C.) | MPa | 24.04 | 19.35 | 28.65 | 36.67 |
| tan delta | | 0.402 | 0.367 | 0.620 | 0.615 |
| G' (60° C.) | MPa | 11.07 | 9.58 | 9.16 | 10.62 |
| tan delta | | 0.188 | 0.186 | 0.222 | 0.233 |

Comparing the formulation comprising aromatic oil to those comprising the HPAs, simple mechanical properties such as tensile strength were equivalent. The tensile strength and tear strength of Example 3's Compound 2 containing naphthenic oil was lower than for the compounds containing the hydrocarbon polymer additive polymer additives or aromatic oil.

Replacing the aromatic oil with hydrocarbon polymer additive polymer additives resulted in an improvement in tear strength and equivalent adhesion to a model natural rubber tire casing compound. It also resulted in an increase in G' and tan delta at 0° C.

Replacing aromatic oil with naphthenic oil led to a loss in compound stiffness (i.e., G'), drop in resistance to fatigue, loss in tear strength, and an increase in room temperature rebound. Use of HPAs in place of aromatic oil resulted in maintenance of these properties with little impact on compound processing qualities under factory operating conditions (i.e., cold feed extruder compound shear rates).

Example 4

In Example 4, HPA A and HPA B were evaluated in a model radial light truck tire (Model RLT) tread compound. The formulation is listed in Table 11. Aromatic oil, naphthenic oil, HPA A, and HPA B were tested at 10 phr in the compound.

TABLE 11

Model RLT Tire Tread Compound

| Ingredient | PHR |
|---|---|
| Natural Rubber (SBR 1500) | 100.00 |
| N234 | 50.00 |
| Renacit 11 | 0.10 |
| 6PPD | 2.00 |
| TMQ | 1.00 |
| Wax | 1.50 |

TABLE 11-continued

Model RLT Tire Tread Compound

| Ingredient | PHR |
|---|---|
| Stearic Acid | 2.00 |
| ZnO | 3.00 |
| Oil or HPA | 10.00 |
| TBBS | 0.75 |
| DPG | 0.40 |
| Sulfur | 1.60 |
| PVI | 0.10 |

Test data is shown in Table 12. The addition of the HPAs in place of aromatic oil or naphthenic oil had little effect on compound processing properties. The compounds comprising HPAs had satisfactory tear strength, abrasion resistance, and 300% modulus.

Replacing aromatic oil with naphthenic oil resulted in a drop in G' and tan delta at 0° C. This may indicate a potential drop in tire wet traction performance and loss in tire wear uniformity, and in turn a decrease in miles to tire removal. Replacing aromatic oil with hydrocarbon polymer additive polymer additives may allow maintenance in tire performance due to the prevention in the drop in G' or tan delta.

TABLE 12

Comparison of Naphthenic Oil, Aromatic Oil, and HPA Polymer Additives in the Model Radial Light Truck Tread Compound

| Compound | | 1 Aromatic Oil | 2 Naphthenic Oil | 3 HPA A | 4 HPA B |
|---|---|---|---|---|---|
| PHR | | 10 | 10 | 10 | 10 |
| Mooney Viscosity | | 63 | 64 | 67 | 66 |
| Capillary Rheometer (100° C., 100 sec$^{-1}$) | | | | | |
| Shear Stress | [KPa] | 269 | 295 | 313 | 308 |
| 300% Modulus. | [MPa] | 9.1 | 9.0 | 8.8 | 8.6 |
| Tear Strength | [N/mm] | 163 | 145 | 144 | 168 |
| Abrasion Resist. (DIN) | | 150 | 162 | 147 | 153 |
| G' (0° C.) | [MPa] | 14.29 | 12.34 | 15.09 | 14.83 |
| tan delta | | 0.252 | 0.225 | 0.262 | 0.256 |
| G' (60° C.) | [MPa] | 8.06 | 7.69 | 8.61 | 8.20 |
| tan delta | | 0.169 | 0.145 | 0.168 | 0.162 |

Example 5

Radial medium truck tires are used on many types of vehicles such as highway tractor-trailer combinations for hauling freight, buses, on-off road construction vehicles, and trucks for municipal applications. The steer axle and trailer axle of such vehicles typically have a natural rubber tread based tread compound. A model of such compounds is illustrated in Table 13. Such compounds can contain natural rubber such as technically specified rubber (TSR) grade 20 or ribbed smoke sheet (RSS) grade 2 or 3. The carbon black used is typically a N100 series, such as N110, or N200 series, such as N220 or N234. The amount of carbon black can vary depending on the grade but will typically be within the range of from 45 phr to 55 phr. In addition, other ingredients will be found such as antioxidants (TMQ), antiozonants (6PPD), waxes and a cure system containing zinc oxide, stearic acid, an accelerator such as a sulfenamide (TBBS), a secondary accelerator if required, a retarder if required, and sulfur as the vulcanizing agent.

TABLE 13

Model RMT Tire Tread Compound

| Ingredient | PHR |
|---|---|
| Natural Rubber (SMR 20) | 100.00 |
| N220 | 50.00 |
| Wax | 1.50 |
| TMQ | 1.00 |
| 6PPD | 2.50 |
| Stearic acid | 2.00 |
| ZnO | 5.00 |
| Oils or HPA | 10.00 |
| TBBS | 1.00 |
| DPG | 0.35 |
| Sulfur | 1.75 |
| PVI | 0.10 |

Data for the model compound containing naphthenic oil, aromatic oil, HPA A, or HPA B is shown in Table 14.

TABLE 14

Comparison of Naphthenic Oil, Aromatic Oil, and HPA Polymer Additives in the Model Radial Medium Truck Tread Compound

| | Compound | | | |
|---|---|---|---|---|
| | 1 Aromatic Oil | 2 Naphthenic Oil | 3 HPA A | 4 HPA B |
| Mooney Viscosity (100° C.) ML1 + 4 | 52.7 | 42 | 53.7 | 52.8 |
| Capillary Rheometer (100° C.) Shear Stress (KPa) | 287.7 | 306 | 296.8 | 258.6 |
| Tensile Strength (MPa) | 26.8 | 27.6 | 21.0 | 27.4 |
| Elongation | 597 | 618 | 438 | 574 |
| 300% Modulus (MPa) | 9.9 | 9.6 | 12.4 | 10.5 |
| Abrasion Resistance (DIN) | 144.0 | — | 140.0 | 146.0 |
| Fatigue to Failure (Kc) | 65.8 | — | 83.7 | 103.4 |
| G' (KPa, 0° C., 10 Hz, 2% strain) | 14.74 | 12.4 | 13.34 | 15.00 |
| tan delta | 0.250 | 0.229 | 0.236 | 0.248 |
| G' (KPa, 60° C., 10 Hz, 2% strain) | 8.26 | 7.55 | 7.83 | 8.67 |
| tan delta | 0.175 | 0.155 | 0.157 | 0.168 |

HPAs in place of aromatic oil allowed maintenance of the compound processing properties. In addition, mechanical properties are satisfactory such as 300% modulus and abrasion resistance. Fatigue resistance for the compounds containing the HPAs was significantly better than that for the compound containing aromatic oil. The compound dynamic properties are all very similar. It would be expected that as the amount of HPAs in the compound increased beyond 10 phr, G' and tan delta would also increase.

Example 6

A blend of naphthenic oil and HPA A was investigated to determine if the loss in properties when switching from aromatic oil to naphthenic oil can be regained. The model compound illustrated in Table 5 was selected. Test data is listed in Table 15.

The data illustrated in Table 15 shows that the tan delta for a compound containing a blend of naphthenic oil and HPA A will match that for a compound containing only aromatic oil (Example 3, Table 10).

TABLE 15

Effect of Blending Naphthenic Oil with HPA A

| Compound | | 1<br>Aromatic Oil | 1<br>Naphthenic Oil | 2<br>HPA A and<br>Naphthenic<br>Oil Blend | 3<br>HPA A |
|---|---|---|---|---|---|
| Aromatic Oil | | 30 | — | — | — |
| Naphthenic Oil | | — | 30 | 15 | — |
| HPA A | | — | — | 15 | 30 |
| Mooney (ML 1 + 4) | MU | — | 60 | 65 | 74 |
| Tensile Strength | MPa | 18.1 | 16.1 | 16.1 | 17.3 |
| Elongation | % | 581 | 437 | 489 | 499 |
| 300% Modulus | MPa | 7.5 | 10.3 | 8.6 | 9.4 |
| Tear (Die B) | KN/m | 69 | 61 | 68 | 69 |
| Rebound (23° C.) | % | 28 | 33 | 25 | 19 |
| Hardness Shore A | | 67 | 69 | 66 | 67 |
| Tan delta (at 0° C.) | | 0.402 | 0.346 | 0.406 | 0.539 |
| Tan delta (at 60° C.) | | 0.188 | 0.177 | 0.186 | 0.218 |

Viewing the data in Examples 1 to 6, it is evident that replacing aromatic oil with naphthenic oil will lead to a loss in compound properties such as tear strength and fatigue resistance. However, more importantly, compound dynamic properties will change. Storage modulus at 0° C. will drop along with tan delta. These properties can be used as predictive tools for the impact on tire wet traction performance (tan delta), tire handling and, potentially, tire wear performance. For example, a drop in G' values can suggest that tire properties such as the cornering coefficient will change.

The use of HPAs can correct the apparent deterioration in compound properties. Specifically, the use of HPA B can result in an increase in storage modulus. When HPA A was blended with naphthenic oil, compounds with properties approximating those of compounds with aromatic oils were obtained. It is expected that compounds containing blends of HPA B and naphthenic oil will behave similarly to those containing blends of HPA A and naphthenic oil.

In sum, aromatic oils when used as a compounding additive, allow the attainment of properties beneficial for tire performance. The replacement of aromatic process oil with oil having a lower polycyclic aromatic content (PCA) such as naphthenic oil will lead to a loss of properties necessary for good tire performance. This would include tan delta (as a predictor of traction), tear strength, and compound stiffness (G'). The addition of HPA A or HPA B can allow an increase in compound stiffness, tan delta, tear strength, fatigue resistance, and other properties which would allow improvement in parameters such as tire traction and tire durability performance.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. An elastomeric composition comprising:
   a) at least one elastomer; and
   b) a hydrocarbon polymer additive, wherein the hydrocarbon polymer additive comprises from 70 weight % to 90 weight % piperylene, from 5 weight % to 15 weight % cyclic components, and from 5 weight % to 20 weight % styrenic components; wherein the hydrocarbon polymer additive is substantially free of amylene or contains less than 10 weight % amylene; wherein the hydrocarbon polymer additive is substantially free of isoprene; and wherein the hydrocarbon polymer additive has a Tg of from 48° C. to 53° C.

2. The composition of claim 1, wherein the at least one elastomer is selected from the group consisting of butyl rubber, halogenated butyl rubber, branched butyl rubber, halogenated star-branched butyl rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprenebutadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

3. The composition of claim 1, wherein the hydrocarbon polymer additive is present from 5 to 50 phr.

4. The composition of claim 1, wherein the hydrocarbon polymer additive is substantially free of indenic components or contains less than 5 weight % indenic components.

5. The composition of claim 1, wherein the elastomeric composition further comprises one or more filler components selected from the group consisting of calcium carbonate, clay, mica, silica, silicates, talc, titanium dioxide, starch wood flour, carbon black, and mixtures thereof.

6. The composition of claim 1, wherein the elastomeric composition is cured.

7. The composition of claim 1, wherein the elastomeric composition is substantially free of aromatic oil.

8. The elastomeric composition of claim 1, wherein the hydrocarbon polymer additive has a number average molecular weight of from 520 g/mole to 650 g/mole.

9. The elastomeric composition of claim 8, wherein the at least one elastomer is selected from the group consisting of butyl rubber, halogenated butyl rubber, branched butyl rubber, halogenated star-branched butyl rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof 10. The elastomeric composition of claim 8, wherein the elastomeric composition is cured.

11. The elastomeric composition of claim 10, wherein the cured elastomeric composition is used for making a tire or a tire component.

12. A cured rubber article comprising an elastomer and a hydrocarbon polymer additive, wherein the hydrocarbon polymer additive comprises from 60 weight % to 90 weight % piperylene, from 5 weight % to 15 weight % cyclic components, and from 5 weight % to 20 weight % styrenic components; wherein the hydrocarbon polymer additive is substantially free of amylene; wherein the hydrocarbon polymer additive is substantially free of isoprene; and wherein the hydrocarbon polymer additive has a Tg of from 48° C. to 53° C.

13. The article of claim 12, wherein the cured rubber article is a tire or tire component.

14. The article of claim 12, wherein the hydrocarbon polymer additive comprises less than 5 weight % indenic components.

15. The article of claim 12, wherein the cured rubber article comprises a tire tread.

16. A cured elastomeric composition obtained by the process of blending an elastomer with from 5 to 50 phr of at least one hydrocarbon polymer additive, and vulcanizing the blend; wherein the at least one hydrocarbon polymer additive comprises from 60 weight % to 90 weight % piperylene, from 5 weight % to 15 weight % cyclic components, and from 5 weight % to 20 weight % styrenic components; wherein the at least one hydrocarbon polymer additive is substantially free of isoprene, contains less than 10 weight % amylene, and contains less than 5 weight % indenic components; and wherein the at least one hydrocarbon polymer additive has a Tg of from 48° C. to 53° C.

17. The composition of claim 16, wherein the at least one hydrocarbon polymer additive has a number average molecular weight of from 520 g/mole to 650 g/mole, and wherein the at least one hydrocarbon polymer additive is substantially free of amylene and indenic compounds.

* * * * *